US012739709B2

(12) United States Patent
Fu et al.

(10) Patent No.: US 12,739,709 B2
(45) Date of Patent: Sep. 15, 2026

(54) HANDOVER PROCESSING METHOD AND APPARATUS, AND COMMUNICATION DEVICE

(71) Applicants: China Mobile Communication Co., Ltd Research Institute, Beijing (CN); China Mobile Communications Group Co., Ltd., Beijing (CN)

(72) Inventors: Yuexia Fu, Beijing (CN); Song Guo, Beijing (CN); Xiaohui Shi, Beijing (CN); Hanyu Ding, Beijing (CN); Liang Geng, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 276 days.

(21) Appl. No.: 18/252,218

(22) PCT Filed: Nov. 19, 2021

(86) PCT No.: PCT/CN2021/131716
§ 371 (c)(1),
(2) Date: May 9, 2023

(87) PCT Pub. No.: WO2022/105868
PCT Pub. Date: May 27, 2022

(65) Prior Publication Data

US 2023/0403611 A1 Dec. 14, 2023

(30) Foreign Application Priority Data

Nov. 20, 2020 (CN) ........................ 202011309650.6

(51) Int. Cl.
*H04W 36/00* (2009.01)
*H04L 67/142* (2022.01)
*H04W 8/26* (2009.01)

(52) U.S. Cl.
CPC ....... *H04W 36/0011* (2013.01); *H04L 67/142* (2013.01); *H04W 8/26* (2013.01)

(58) Field of Classification Search
CPC ..... H04W 36/0011; H04W 36/008355; H04W 36/0055; H04W 36/12; H04W 8/26;
(Continued)

(56) References Cited

U.S. PATENT DOCUMENTS

2010/0054222 A1* 3/2010 Rune .................... H04W 8/082 455/432.1
2010/0284367 A1* 11/2010 Koo ................. H04W 36/0058 370/331
(Continued)

FOREIGN PATENT DOCUMENTS

CN 108028783 A 5/2018
CN 109640319 A 4/2019
(Continued)

OTHER PUBLICATIONS

"3rd Generation Partnership Project; Technical Specification Group Services and System Aspects; Study on enhancement of support for Edge Computing in 5G Core network (5GC) (Release 17)", 3GPP TR 23.748 V1.1.0 (Oct. 2020, Valbonne—France.
(Continued)

*Primary Examiner* — Ricardo H Castaneyra
(74) *Attorney, Agent, or Firm* — Price Heneveld LLP

(57) ABSTRACT

Disclosed in the embodiments of the present application are a switching processing method and apparatus, and a communication device. The method comprises: when determining that a pre-defined condition is met, a user equipment
(Continued)

transmitting, to an edge dispatch node, a domain name system (DNS) resolution request carrying first information, wherein the first information comprises user identifier information, application identifier information, and service continuity demand information; and receiving a DNS resolution response from the edge dispatch node, wherein the DNS resolution response comprises the updated address information of a second edge application server.

14 Claims, 4 Drawing Sheets

(58) Field of Classification Search
CPC ..... H04L 67/142; H04L 67/148; H04L 67/10; H04L 67/141; H04L 61/4511
USPC ........ 370/331, 389, 252; 709/219, 203, 245, 709/238; 455/410
See application file for complete search history.

(56) References Cited

U.S. PATENT DOCUMENTS

| | | | |
|---|---|---|---|
| 2018/0270720 | A1 | 9/2018 | Shi et al. |
| 2019/0058767 | A1 | 2/2019 | Chandramouli et al. |
| 2019/0098118 | A1* | 3/2019 | Utama ................ H04L 61/4511 |
| 2020/0068448 | A1 | 2/2020 | Byun et al. |
| 2020/0120549 | A1 | 4/2020 | Sun et al. |
| 2020/0178198 | A1 | 6/2020 | Ding et al. |
| 2020/0252367 | A1 | 8/2020 | Yang et al. |
| 2020/0329008 | A1* | 10/2020 | Dao .................... H04L 61/5007 |
| 2020/0329403 | A1 | 10/2020 | Yuan et al. |
| 2020/0389531 | A1* | 12/2020 | Lee ......................... H04L 67/52 |
| 2020/0396652 | A1* | 12/2020 | Decarreau ......... H04W 36/0033 |
| 2021/0368397 | A1 | 11/2021 | Sun et al. |
| 2022/0124147 | A1* | 4/2022 | Ge ........................ H04L 47/781 |
| 2022/0264690 | A1* | 8/2022 | Zhu ....................... H04W 76/11 |

FOREIGN PATENT DOCUMENTS

| | | | |
|---|---|---|---|
| CN | 109788513 | A | 5/2019 |
| CN | 109981316 | A | 7/2019 |
| CN | 109995723 | A | 7/2019 |
| CN | 111491013 | A | 8/2020 |
| EP | 3177075 | A1 | 6/2017 |
| WO | 2018232759 | A1 | 12/2018 |
| WO | 2020223364 | A1 | 11/2020 |
| WO | 2020226454 | A1 | 11/2020 |

OTHER PUBLICATIONS

Damas et al., "Extension Mechanisms for DNS (EDNS (0))", Internet Engineering Task Force (IETF), RFC 6891, Apr. 2013, Geneva, Switzerland.

Yuexia Fu et al., "Draft new Recommendation ITU-T Y.FMC-AAEC-req: Use Cases and Technical requirements for supporting application addressing in edge computing for future networks including IMT-2020 network", SG13-TD631/WP1, Study Period 2017-2020, Virtual, Jul. 20-31, 2020.

Yuexia Fu et al., "Draft new Recommendation ITU-T Y.FMC-AAEC-req: Application addressing in edge computing in IMT-2020 network and beyond", SG13-TD683/WP1, Study Period 2022-2024, Geneva, Mar. 4-15, 2024.

3GPP, 3rd Generation Partnership Project; Technical Specification Group Services and System Aspects; Study on enhancement of support for Edge Computing in 5G Core network (5GC) (Release 17); 3GPP TR 23.748 V0.3.0 (Jan. 2020).

"3rd Generation Partnership Project; Technical Specification Group Services and System Aspects; System architecture for the 5G System (5GS); Stage 2 (Release 16)", 3GPP TS 23.501 V16.6.0 (Sep. 2020), Valbonne—France.

First Singaporean Office Action for Singaporean Patent Application No. 11202303781X, dated Mar. 12, 2026, 8 pages.

* cited by examiner

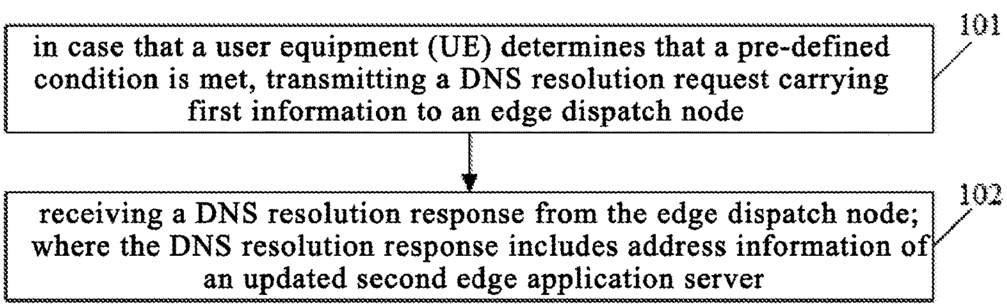

FIG. 1

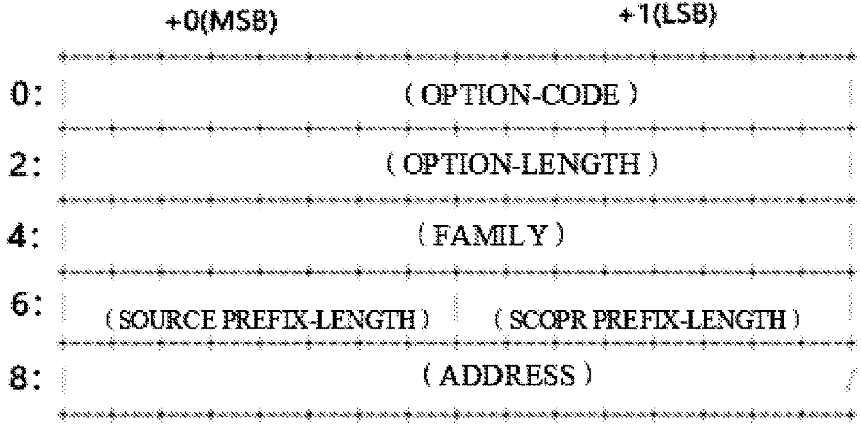

FIG. 2

UE
application client
SMF
NEF
first edge application server
edge dispatch node
establishes a session
11: the first edge application server request subscription to the SMF through NEF, the SMF feeds back a response message, and subscription is successful
12: transmit a notification message which carries UPF handover information
13: transmit the UPF handover information
14: transmit DNS resolution request which carries first information

FIG. 3

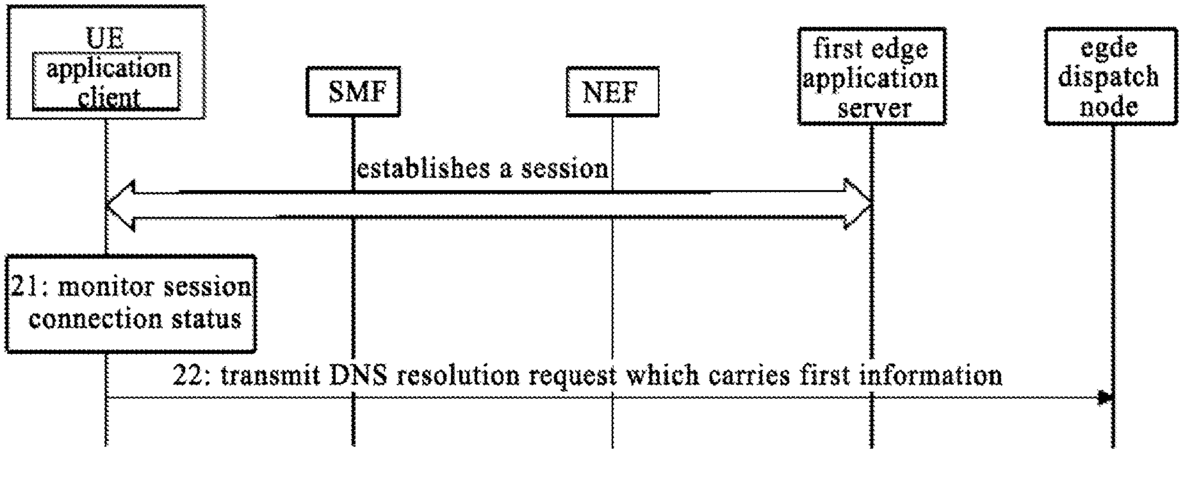

FIG. 4

201: receiving, by edge dispatch node, DNS resolution request from UE; where the DNS resolution request carries first information, and the first information includes user identification information, application identification information and service continuity needs 202: reselecting a second edge application server for the UE based on the service continuity needs and the user identification information, and transmitting a DNS resolution response to the UE, where the DNS resolution response carries address information of the second edge application server

FIG. 5

HANDOVER PROCESSING METHOD AND APPARATUS, AND COMMUNICATION DEVICE

CROSS-REFERENCE TO RELATED APPLICATION

This application is the U.S. national phase of PCT Application PCT/CN2021/131716 filed on Nov. 19, 2021, which claims the priority of Chinese Application No. 202011309650.6, filed on Nov. 20, 2020, the disclosure of which is incorporated in its entirety by reference herein.

TECHNICAL FIELD

The present application relates to the field of edge computing, and in particular to a handover processing method, apparatus and a communication device.

BACKGROUND

With the development of edge computing, the number of edge service nodes increases, and the same service may be deployed on multiple service nodes. Therefore, there is a problem of selecting an optimal edge service node. An edge computing dispatch center is deployed globally. When the edge computing dispatch center receives a service request from a user, the edge computing dispatch center can select an edge service node according to a corresponding dispatch policy and return a domain name resolution result.

However, in case that a user equipment (UE) moves, how to perform handover of the UE to one of the edge service nodes to avoid the problem of service interruption caused by mobility, there is currently no effective solution.

SUMMARY

Embodiments of the present disclosure provide a handover processing method, apparatus and a communication device.

In order to achieve the above purpose, the technical solution of the embodiments of the present application are as follows.

In the first aspect, one embodiment of the present application provides a handover processing method, including:

in case that a user equipment (UE) makes sure a pre-defined condition is met, transmitting, by the UE, a domain name system (DNS) resolution request carrying first information, to an edge dispatch node; wherein the first information includes user identification information, application identification information and service continuity needs;

receiving a DNS resolution response from the edge dispatch node; wherein the DNS resolution response includes address information of an updated second edge application server.

In some optional embodiments of the present application, the method further includes:

in case that the UE receives user plane function (UPF) handover information transmitted by a first edge application server before updating, making sure the pre-defined condition is met;

wherein the UPF handover information is transmitted after the first edge application server receives a notification message from a session management function (SMF), and the notification message indicates that accessing UPF of UE changes.

In some optional embodiments of the present application, the method further includes:

obtaining, by the UE, a connection status parameter between the UE and the first edge application server;

when the connection status parameter reaches a preset threshold, determining that the pre-defined condition is met.

In some optional embodiments of the present application, an extension field in the DNS resolution request carries the user identification information.

In the second aspect, one embodiment of the present application provides a handover processing method, including:

receiving, by an edge dispatch node, a domain name system (DNS) resolution request from a user equipment (UE); wherein the DNS resolution request carries first information, and the first information includes user identification information, application identification information and service continuity needs;

reselecting a second edge application server for the UE based on the service continuity needs and the user identification information, and transmitting a DNS resolution response to the UE, wherein the DNS resolution response carries address information of the second edge application server.

In some optional embodiments of the present application, the method further includes:

transmitting, by the edge dispatch node, a synchronization instruction to the first edge application server and the second edge application server, respectively; wherein the first edge application server is an edge application server before updating, and the synchronization instruction includes: user identification information, application identification information and service continuity needs; the synchronization instruction instructs the first edge application server synchronizes service data corresponding to the user identification information to the second edge application server.

In some optional embodiments of the present application, the method further includes: storing, by the edge dispatch node, a domain name resolution record; wherein the domain name resolution record includes at least a mapping relationship multiple sets between of user identification information and address information of edge application servers.

In some optional embodiments of the present application, before transmitting, by the edge dispatch node, a synchronization instruction to the first edge application server and the second edge application server, respectively, the method further includes:

querying, by the edge dispatch node, the domain name resolution record, based on the user identification information, and determining address information of the first edge application server and the address information of the second edge application server.

In some optional embodiments of the present application, the method further includes:

transmitting, by the edge dispatch node, a notification message to a session management function (SMF) through a network exposure function (NEF) or a policy control function (PCF); wherein the notification message includes the user identification information and information of the second edge application server, the notification message is used to enable the SMF to configure a corresponding traffic offloading rule for a service corresponding to the user identification information.

In the third aspect, one embodiment of the present application provides a handover processing apparatus, including: a first determination unit and a first communication unit;

wherein the first determination unit is configured to determine whether a pre-defined condition is met;

the first communication unit is configured to, in case that the first determination unit determines that the pre-defined condition is met, transmit a domain name system (DNS) resolution request carrying first information, to an edge dispatch node; wherein the first information includes user identification information, application identification information and service continuity needs; and receive a DNS resolution response from the edge dispatch node; wherein the DNS resolution response includes address information of an updated second edge application server.

In some optional embodiments of the present application, the first determination unit is configured to, in case that the first communication unit receives UPF handover information transmitted by the first edge application server before updating, determine that the pre-defined condition is met;

wherein the UPF handover information is transmitted after the first edge application server receives a notification message from an SMF, and the notification message indicates that accessing UPF of UE changes.

In some optional embodiments of the present application, the first determination unit is configured to obtain a connection status parameter with the first edge application server; when the connection status parameter reaches a preset threshold, determine that the pre-defined condition is met.

In some optional embodiments of the present application, an extension field in the DNS resolution request carries the user identification information.

In the fourth aspect, one embodiment of the present application provides a handover processing apparatus, including: a second determination unit and a selection unit;

wherein the second communication unit is configured to receive a DNS resolution request from a user equipment (UE); wherein the DNS resolution request carries first information, and the first information includes user identification information, application identification information and service continuity needs;

the selection unit is configured to reselect a second edge application server for the UE based on the service continuity needs and the user identification information;

the selection unit is further configured to transmit a DNS resolution response to the UE, wherein the DNS resolution response carries address information of the second edge application server.

In some optional embodiments of the present application, the second communication unit is further configured to transmit a synchronization instruction to the first edge application server and the second edge application server, respectively; wherein the first edge application server is an edge application server before updating, and the synchronization instruction includes: user identification information, application identification information and service continuity needs, the synchronization instruction instructs the first edge application server synchronizes service data corresponding to the user identification information to the second edge application server.

In some optional embodiments of the present application, the apparatus further includes a storage unit configured to store a domain name resolution record;

the domain name resolution record includes at least a mapping relationship multiple sets between of user identification information and address information of edge application servers.

In some optional embodiments of the present application, the apparatus further includes a second determination unit configured to, before the second communication unit transmits the synchronization instruction to the first edge application server and the second edge application server respectively, query the domain name resolution record based on the user identification information, and determine address information of the first edge application server and the address information of the second edge application server.

In some optional embodiments of the present application, the second communication unit is further configured to transmit a notification message to a session management function (SMF) through a network exposure function (NEF) or a policy control function (PCF); wherein the notification message includes the user identification information and information of the second edge application server, the notification message is used to enable the SMF to configure a corresponding traffic offloading rule for a service corresponding to the user identification information.

In the fifth aspect, one embodiment of the present application provides a computer-readable storage medium, including a computer program stored thereon; wherein the program is executed by a processor to perform the steps of the method described in the first aspect or the second aspect of the embodiment of the present application.

In the sixth aspect, one embodiment of the present application provides a communication device, including: a memory, a processor and a computer program stored in the memory and executable on the processor; wherein the processor executes the program to perform the steps of the method described in the first aspect or the second aspect of the embodiment of the present application.

According to the handover processing method, apparatus and the communication device provided in the embodiments of the present disclosure, in case that a user equipment (UE) determines that a pre-defined condition is met, the UE transmits a domain name system (DNS) resolution request carrying first information to an edge dispatch node; wherein the first information includes user identification information, application identification information and service continuity needs; the edge dispatch node reselects a second edge application server for the UE based on the service continuity needs and the user identification information, and transmits a DNS resolution response to the UE, wherein the DNS resolution response carries address information of the second edge application server. By using the technical solutions of the embodiments of the present application, on the one aspect, when the pre-defined condition is met the UE is triggered to transmit a DNS resolution request, and the edge dispatch node reselects a new edge application server for the UE based on the DNS resolution request, thereby solving the problem of triggering switching of edge application servers.

BRIEF DESCRIPTION OF THE DRAWINGS

FIG. 1 is a first schematic flowchart of a handover processing method according to an embodiment of the present application;

FIG. 2 is a schematic diagram of a DNS extension field in a handover processing method according to an embodiment of the present application;

FIG. 3 is a first schematic diagram of a way for a user equipment to determine that a pre-defined condition is met, in a handover processing method according to an embodiment of the present application;

FIG. 4 is a second schematic diagram of a way for a user equipment to determine that a pre-defined condition is met, in a handover processing method according to an embodiment of the present application;

FIG. 5 is a second schematic flowchart of a handover processing method according to an embodiment of the present application;

DETAILED DESCRIPTION

Figure 6:
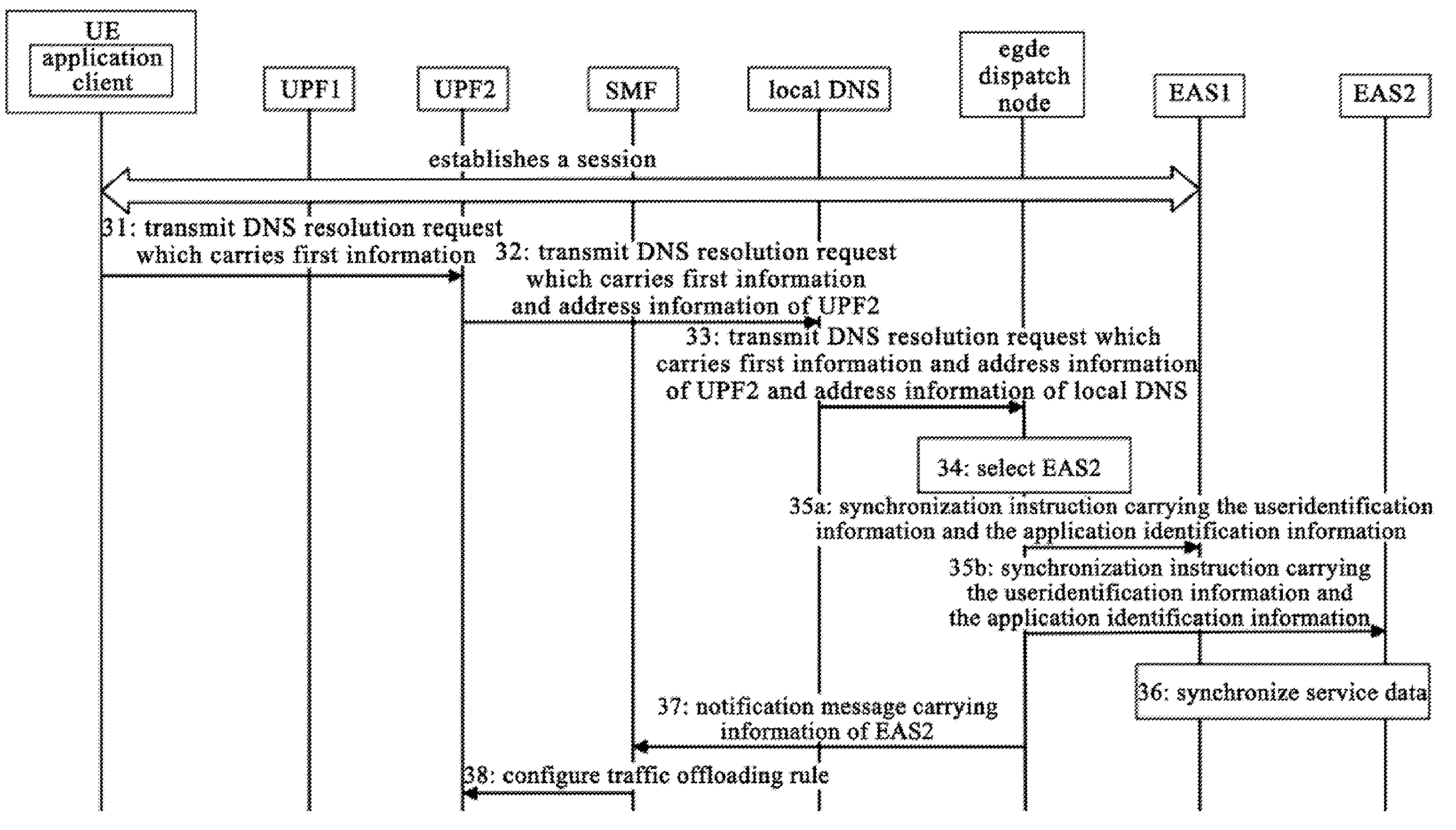
FIG. 6 is a schematic diagram showing an interaction flow of a handover processing method according to an embodiment of the present application.

The present application will be described hereinafter in details with reference to the accompanying drawings and specific embodiments.

One embodiment of the present application provides a handover processing method. FIG. 1 is a first schematic flowchart of a handover processing method according to an embodiment of the present application. As shown in FIG. 1, the method includes:

Step 101: in case that a user equipment (UE) determines that a pre-defined condition is met, transmitting, by the UE, a DNS resolution request carrying first information, to an edge dispatch node; where the first information includes user identification information, application identification information and service continuity needs;

Step 102: receiving a DNS resolution response from the edge dispatch node; where the DNS resolution response includes address information of an updated second edge application server.

The handover processing method in this embodiment is applied to the UE, and optionally, may be applied to an application client in the UE.

The application client may be a client which is configured or installed in the UE and which is corresponding to an application deployed in an edge side when the UE accesses the application through the mobile network.

In this embodiment, before the UE transmits the DNS resolution request carrying the first information to the edge dispatch node, the UE (or, the application client) has established a connection with an edge application server (referred to as a first edge application server) deployed on the edge side through the mobile network, and uses services through an application function provided by the first edge application server. During the process of establishing the connection between the UE and the first edge application server, the UE (or the application client) transmits the DNS resolution request. In some embodiments, information carried in the DNS resolution request does not include service continuity needs. Optionally, during movement of the UE, it is likely that a UPF connected to the UE is switched or a network status between the UE and the first edge application server is not good. In view of this, in this embodiment, the UE (or the application client) re-transmits the DNS resolution request. Compared with a DNS resolution request transmitted earlier, the DNS resolution request re-transmitted this time carries the first information which includes the service continuity needs, where the service continuity needs can be used to indicate that the edge application server is to be switched, or to indicate to switch the edge application server.

Optionally, the service continuity needs may be indicated by a specific field in the DNS resolution request. As an implementation manner, in case that the specific field in the DNS resolution request is filled with a numerical value, it may indicate that the service continuity needs is carried; in case that the specific field in the DNS resolution request is not filled with a numerical value, it may indicate that the service continuity needs is not carried. As another implementation manner, in case that the specific field in the DNS resolution request is filled with a first set value, it may indicate that the service continuity needs is carried; in case that the specific field in the DNS resolution request is filled with a second set value, it may indicate that the service continuity needs is not carried. For example, the first set value may be "1", and the second set value may be "0". Of course, examples of the set values (including the first set value and the second set value) in this embodiment are not limited to the above example, which are not limited in this embodiment.

In this embodiment, the edge dispatch node is a functional entity with edge dispatch and related functions. For example, the edge dispatch node may be an edge dispatch device or an edge dispatch center in form of an independent device or server, or may be jointly set up with other functional entities.

In some optional embodiments of the present application, the extension field in the DNS resolution request carries the user identification information. Fr example, the user identification information may be address information of the UE, such as UE IP.

In this embodiment, the UE and each network device support extension mechanism for DNS (EDNS0). Optionally, the user identification information in the first information may be carried through an extension field shown in FIG. 2. For example, the user identification information may be carried through an option-code field shown in FIG. 2.

In this embodiment, the UE (or the application client) can determine whether the pre-defined condition is met in the following multiple ways.

As an optional embodiment, the method further includes: in case that the UE receives UPF handover information transmitted by the first edge application server before updating, making sure the predefined condition ismet; where the UPF handover information is transmitted after the first edge application server receives a notification message from an SMF, and the notification message indicates that accessing UPF of UE changes.

In this embodiment, the first edge application server obtains the UPF handover information by subscribing to a user plane event management capability, so that after the SMF learns that the UPF connected to the UE is switched, the SMF transmits the UPF handover information, based on the subscription of the first edge application server. That is, the first edge application server can finally obtain the UPF handover information from the SMF.

For example, FIG. 3 is a first schematic diagram of a way for a user equipment to determine that a pre-defined condition is met, in a handover processing method according to an embodiment of the present application. As shown in FIG. 3, the way includes the following steps.

Step 11: after the first edge application server establishes a session with the UE (or the application client), transmitting, by the first edge application server, a message for requesting subscription to a NEF, where the message is used to subscribe to user plane event management; after the NEF receives the message, transmitting, by the NEF, a subscription message to the SMF; and feeding back, by the SMF, a response message. At this point, the subscription is successful.

For example, the subscription message may include: relevant information of the UE and relevant information of the first edge application server, so that the SMF can generate and transmit a notification message in case that the SMF determines that the UPF accessed by the UE is switched.

The relevant information of the UE may be user identification information or IP address information of the UE, and so on. Optionally, the subscription message may further include a subscription duration, and the subscription duration may indicate a validity duration of the current subscription. It is to be understood that in case that the subscription duration is invalid, even if the SMF determines that the UPF accessed by the UE is switched, the SMF transmits no notification message to the first edge application server.

Step 12: after the SMF learns that the UPF connected to the UE is switched, generating and transmitting, by the SMF, a notification message, where the notification message carries UPF handover information.

For example, the UPF handover information may include: relevant information of a switched UPF. For example, the relevant information of the switched UPF may include information such as an identifier or an address of the switched UPF.

Step 13: transmitting, by the first edge application server, the UPF handover information to the UE (or the application client).

Step 14: transmitting, by the UE (or the application client), a DNS resolution request to the edge dispatch node, where the DNS resolution request carries the above first information, and the first information includes user identification information, application identification information and service continuity needs.

The application identification information can be used to uniquely represent an application, and different applications may correspond to different application identification information.

As another optional embodiment, the method further includes: obtaining, by the UE, a connection status parameter between the UE and the first edge application server; when the connection status parameter reaches a preset threshold, determining that the pre-defined condition is met.

In this embodiment, the UE (or the application client) can determine whether to retransmit the DNS resolution request by monitoring a connection status between the UE and the first edge application server.

For example, FIG. 4 is a second schematic diagram of a way for a user equipment to determine that a pre-defined condition is met, in a handover processing method according to an embodiment of the present application. As shown in FIG. 4, the way includes the following steps.

Step 21: after the UE (or the application client) establishes a session with the first edge application server, monitoring, by the UE (or the application client), a session connection status.

A monitored session connection parameter includes, but is not limited to, at least one of the following: delay, uplink/downlink rate, packet loss rate, and the like.

Step 22: in case that the UE (or the application client) monitors that the session connection parameter reaches a preset threshold, transmitting, by the UE (or the application client), a DNS resolution request to the edge dispatch node, where the DNS resolution request carries the above first information, and the first information includes user identification information, application identification information and service continuity needs.

For example, in case that it is monitored that the delay is greater than a first preset threshold, the UE (or the application client) retransmits the DNS resolution request. For another example, in case that it is monitored that the uplink/downlink rate is less than a second preset threshold, the UE (or the application client) retransmits the DNS resolution request.

The technical solution of this embodiment is not limited to the scenario where the UE moves, and is applied to the following scenarios:

Scenario 1: movement of the UE causes a connection status with an original server to deteriorate, for example, delay is too long; after the UE (or the application client) detects that the session connection status has deteriorated, the UE (or the application client) retransmits the DNS resolution request;

Scenario 2: the UE does not move, but performance of the first edge application server deteriorates, resulting in poor session connection status, for example, the delay increases; after the UE (or the application client) detects that the session connection status has deteriorated, the UE (or the application client) retransmits the DNS resolution request.

In this embodiment, after the edge dispatch node obtains the DNS resolution request from the UE (or the application client), the edge dispatch node allocates a new edge application server (that is, a second edge application server) to the UE (or the application client), and uses the DNS resolution response to carry address information of the second edge application server. After the UE (or the application client) receives the DNS resolution response, the UE (or the application client) initiates a connection to the second edge application server based on the address information of the second edge application server carried in the DNS resolution response.

Based on the foregoing embodiments, one embodiment of the present application further provides a handover processing method. FIG. 5 is a second schematic flowchart of a handover processing method according to an embodiment of the present application. As shown in FIG. 5, the method includes:

Step 201: receiving, by an edge dispatch node, a DNS resolution request from a user equipment (UE); where the DNS resolution request carries first information, and the first information includes user identification information, application identification information and service continuity needs;

Step 202: reselecting a second edge application server for the UE based on the service continuity needs and the user identification information, and transmitting a DNS resolution response to the UE, where the DNS resolution response carries address information of the second edge application server.

In this embodiment, the edge dispatch node is a functional entity with edge dispatch and related functions. For example, the edge dispatch node may be an edge dispatch device or an edge dispatch center in form of an independent device or server, or may be jointly set up with other functional entities.

In this embodiment, the DNS resolution request may be transmitted by the UE and arrive at the edge dispatch node via a UPF and a local DNS device. Each device needs to support extension mechanism for DNS. The user identification information is carried through an extension field in the DNS resolution request.

For example, the DNS resolution request transmitted by the UE (or the application client) carries the user identification information, the application identification information and the service continuity needs (i.e., the first information), where the user identification information is carried through the extension field. After the DNS resolution request reaches the UPF, the UPF fills the UPF's address information (such as UPF IP) in the DNS resolution request and transmits it to the local DNS device. After the message reaches the local DNS device, the local DNS device fills address information of the local DNS device (such as IP of the local DNS device) in the DNS resolution request and transmits it to the edge dispatch node. The edge dispatch node obtains the DNS resolution request, and obtains information such as the first information, the address of the UPF and the address information of the local DNS device from the obtained DNS resolution request. In the conventional technical solution, a DNS resolution request does not include user identification information, that is, an edge dispatch node cannot obtain the user identification information, but can only obtain relevant information of the UPF.

In this embodiment, after the edge dispatch node receives the DNS resolution request, based on the service continuity needs carried in the DNS resolution request, the edge dispatch node may determine that an edge application server accessed by the UE (or the application client) needs to be switched. Then, based on the user identification information, the edge dispatch node reselects a new edge application server (referred to as a second edge application server) for the UE (or the application client), and transmits address information of the second edge application server to the UE (or the application client) through a DNS resolution response.

In some optional embodiments, the edge dispatch node may determine the UE's location information based on the user identification information, and select the second edge application server for the UE (or application client) based on the UE's location information. The selected second edge application server is an edge application server closest to the location information of the UE. In other optional embodiments, the edge dispatch node may also determine location information of the UPF based on the address information of the UPF carried in the DNS resolution request, and select the second edge application server for the UE (or the application client) based on the location information of the UPF. The selected second edge application server is an edge application server closest to the location information of the UPF.

In some optional embodiments, in case that the DNS resolution request received by the edge dispatch node does not include service continuity needs, the edge dispatch node directly schedules nodes according to the UPF information in the DNS resolution request. This embodiment is applicable to a scenario in which the UE (or the application client) accesses an edge application server for the first time (for example, accessing the first edge application server for the first time).

In some optional embodiments of the present application, the method further includes: transmitting, by the edge dispatch node, a synchronization instruction to the first edge application server and the second edge application server, respectively; where the first edge application server is an edge application server before updating, and the synchronization instruction includes: user identification information, application identification information and service continuity needs. The synchronization instruction is used to instruct the first edge application server to synchronize service data corresponding to the user identification information to the second edge application server.

In this embodiment, in order to ensure service continuity after the edge application server is switched, the edge dispatch node transmits the synchronization instruction to the first edge application server before switching and the second edge application server after switching, respectively, where the synchronization instruction includes: the user identification information, the application identification information and the service continuity needs. Optionally, the synchronization instruction may further include authentication information. The synchronization instruction is used to instruct the first edge application server and the second edge application server to synchronize application data of the UE corresponding to the user identification information.

In some optional embodiments of the present application, the method further includes: storing, by the edge dispatch node, a domain name resolution record; where the domain name resolution record includes at least a mapping relationship multiple sets between of user identification information and address information of edge application servers.

In this embodiment, each time the edge dispatch node receives a DNS resolution request, the edge dispatch node stores a domain name resolution record, according to the DNS resolution request and information about an application server selected for a corresponding application client. For example, an example of the domain name resolution record may be shown in the following Table 1, which includes user identifier (corresponding to user identification information), source IP (address information of UPF that the message passes through), local DNS IP (address information of local DNS device that the message passes through), domain name information, and address information of edge application server (EAS), and so on.

TABLE 1

| user identifier storage time | user identifier | source IP | Local DNS IP | domain name | edge application server |
|---|---|---|---|---|---|
| | UE1 IP | UPF1 IP | Local DNS 1 IP | aaa.com | EAS1 IP |
| | UE2 IP | UPF3 IP | Local DNS 2 IP | aaa.com | |
| | UE1 IP | UPF2 IP | Local DNS 1 IP | aaa.com | EAS2 IP |
| | UE2 IP | UPF4 IP | Local DNS 2 IP | aaa.com | |

In some optional embodiments of the present application, before transmitting, by the edge dispatch node, a synchronization instruction to the first edge application server and the second edge application server, respectively, the method further includes: querying, by the edge dispatch node, the domain name resolution record, based on the user identification information, and determining address information of the first edge application server and address information of the second edge application server.

For example, according to the records shown in Table 1, after the edge dispatch node receives the DNS resolution request, in case that the DNS resolution request carries service continuity needs, the edge dispatch node can obtain address information of a corresponding edge application server by querying the domain name resolution record. For example, EAS1 IP and EAS 2IP are corresponding to the same user identification information UE1 IP, and the edge dispatch node transmits a synchronization instruction to EAS1 IP and EAS2 IP, respectively.

Optionally, in case that the UE (or the application client) ends the current service, the edge dispatch node deletes relevant records in the domain name resolution record. As an example, in case that the UE (or the application client) is handed over from the first edge application server to the second edge application server, after the handover is completed, the edge dispatch node deletes a domain name resolution record related to the first edge application server. As another example, after the UE (or the application client) finishes accessing an edge application server, the edge dispatch node may delete all domain name resolution records corresponding to the user identification information.

In some optional embodiments of the present application, the method further includes: transmitting, by the edge dispatch node, a notification message to the SMF through a NEF or a PCF; where the notification message includes the user identification information and information of the second edge application server. The notification message is used to enable the SMF to configure a corresponding traffic offloading rule for a service corresponding to the user identification information.

In this embodiment, the edge dispatch node transmits the notification message to the SMF through the NEF or PCF, and the notification message carries the user identification information and the information of the switched second edge application server, etc., to inform the SMF that the UE is assigned or switched to the second edge application server. Then, the SMF further configures corresponding traffic offloading rules for UPF or service accessed by the UE, so that the UE can re-access a new second edge application server (i.e., the second edge application server).

By using the technical solutions of the embodiments of the present application, in the first aspect, when the pre-defined condition is met, the UE (or the application client) is triggered to transmit a DNS resolution request, and the edge dispatch node reselects a new edge application server for the UE (or the application client) based on the DNS resolution request, thereby solving the problem of triggering switching of edge application servers. On the other hand, through the DNS resolution request carrying the user identification information, the application identification information and the service continuity needs, the edge dispatch node transmits, before the switching is completed, a synchronization instruction to the first edge application server and the second edge application server to complete data synchronization, thereby ensuring that the service is not interrupted and the service continuity needs is met. In the third aspect, by defining a communication interface between the edge dispatch node and the core network, synchronization of information about handover of the edge application servers to the SMF is realized, thereby realizing configuration of relevant traffic offloading rules.

The handover processing method of the embodiment of the present application will be described hereinafter with reference to a specific example. In this example, the edge dispatch node is a functional entity with edge dispatch and related functions. For example, the edge dispatch node may be an edge dispatch device or an edge dispatch center in form of an independent device or server, or may be jointly set up with other functional entities.

FIG. 6 is a schematic diagram showing an interaction flow of a handover processing method according to an embodiment of the present application. As shown in FIG. 6, the method includes the following steps.

At steps 31 to 33, a UE (or an application client) transmits a DNS resolution request to UPF2, where the DNS resolution request carries first information and the first information includes user identification information, application identification information and service continuity needs; the UPF2 transmits a DNS resolution request to a local DNS, where the DNS resolution request includes the above first information and address information of the UPF2; the local DNS transmits a DNS resolution request to the edge dispatch node, where the DNS resolution request includes the above first information, the address information of the UPF2 and address information of the local DNS.

It is to be noted that the steps 31 to 33 in this embodiment are based on establishment of a session between the UE (or the application client) and the EAS1, and the UE (or the application client) has determined that the pre-defined condition is met, and the pre-defined condition is that a UPF connected to the UE has been switched from UPF1 to UPF2. The specific implementation manner for the UE (or the application client) to determine that the pre-defined condition is met may be referred to description described in the above embodiments, which will not be repeated here.

At step 34, the edge dispatch node selects EAS2 for the application client.

Here, the edge dispatch node may determine the UE's location information based on the user identification information, and select EAS2 for the UE (or the application client) based on the UE's location information; the selected second edge application server is an edge application server closest to the UE's location information.

EAS1 is corresponding to the first edge application server in the above embodiment; EAS2 is corresponding to the second edge application server in the above embodiment.

At steps 35*a* to 35*b*, the edge dispatch node transmits a synchronization instruction to EAS1 and EAS2, respectively, where the synchronization instruction carries the user identification information and the application identification information.

At step 36, service data is synchronized between EAS1 and EAS2.

At steps 37 to 38, the edge dispatch node transmits a notification message to the SMF, where the notification message carries information of EAS2; the SMF configures a traffic offloading rule.

Here, the edge dispatch node may transmit a notification message to the SMF through the NEF or PCF, and the notification message carries information of EAS2. Optionally, the notification message may further carry the user identification information, thereby informing the SMF that the UE is allocated or switched to EAS2. The SMF further configures corresponding traffic offloading rules for the UPF or service accessed by the UE.

Figure 7:
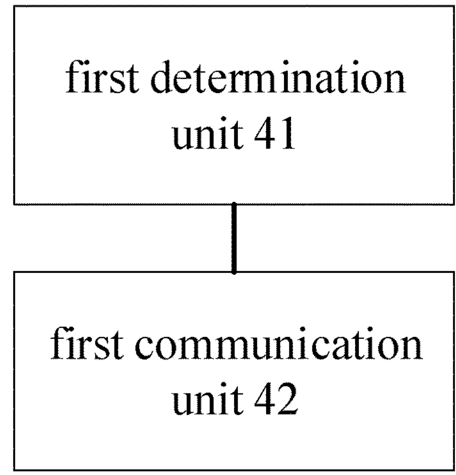
FIG. 7 is a first schematic diagram of a handover processing apparatus according to an embodiment of the present application.

One embodiment of the present application further provides a handover processing apparatus. FIG. 7 is a first schematic diagram of a handover processing apparatus according to an embodiment of the present application. As shown in FIG. 7, the apparatus includes a first determination unit 41 and a first communication unit 42.

The first determination unit 41 is configured to determine whether a pre-defined condition is met.

The first communication unit 42 is configured to, in case that the first determination unit 41 determines that the pre-defined condition is met, transmit a DNS resolution request carrying first information, to an edge dispatch node; where the first information includes user identification information, application identification information and service continuity needs; and receive a DNS resolution response from the edge dispatch node; where the DNS resolution response includes address information of an updated second edge application server.

In some optional embodiments of the present application, the first determination unit 41 is configured to, in case that the first communication unit 42 receives UPF handover information transmitted by the first edge application server before updating, determine that the pre-defined condition is met; where the UPF handover information is transmitted after the first edge application server receives a notification message from an SMF, and the notification message indicates that accessing UPF of UE changes.

In some optional embodiments of the present application, the first determination unit 41 is configured to obtain a connection status parameter with the first edge application server; when the connection status parameter reaches a preset threshold, determine that the pre-defined condition is met.

In some optional embodiments of the present application, an extension field in the DNS resolution request carries the user identification information.

In the embodiment of the present application, the first determination unit 41 in the apparatus may be implemented, in practical applications, through a central processing unit (CPU), a digital signal processor (DSP), a microcontroller unit (MCU), or a field-programmable gate array (FPGA). The first communication unit 42 in the apparatus may be implemented, in practical applications, through a communication module (including: basic communication suite, operating system, communication modules, standardized interfaces and protocols, etc.) and transceiver antenna.

Figure 8:
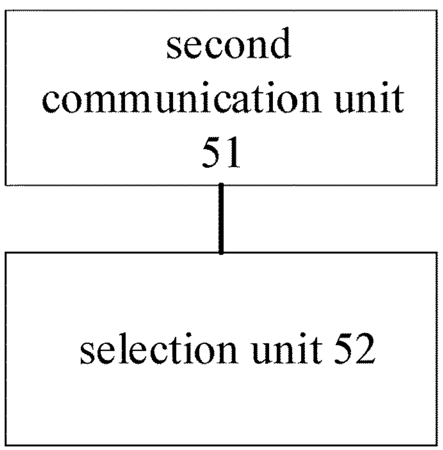
FIG. 8 is a second schematic diagram of a handover processing apparatus according to an embodiment of the present application.

One embodiment of the present application further provides a handover processing apparatus. FIG. 8 is a second schematic diagram of a handover processing apparatus according to an embodiment of the present application. As shown in FIG. 8, the apparatus includes a second determination unit 51 and a selection unit 52.

The second communication unit 51 is configured to receive a DNS resolution request from a user equipment (UE); where the DNS resolution request carries first information, and the first information includes user identification information, application identification information and service continuity needs.

The selection unit 52 is configured to reselect a second edge application server for the UE based on the service continuity needs and the user identification information.

The selection unit 52 is further configured to transmit a DNS resolution response to the UE, where the DNS resolution response carries address information of the second edge application server.

In some optional embodiments of the present application, the second communication unit 51 is further configured to transmit a synchronization instruction to the first edge application server and the second edge application server, respectively; where the first edge application server is an edge application server before updating, and the synchronization instruction includes: user identification information, application identification information and service continuity needs. The synchronization instruction is used to instruct the first edge application server to synchronize service data corresponding to the user identification information to the second edge application server.

In some optional embodiments of the present application, the apparatus further includes a storage unit configured to store a domain name resolution record. The domain name resolution record includes at least a mapping relationship multiple sets between of user identification information and address information of edge application servers.

In some optional embodiments of the present application, the apparatus further includes a second determination unit configured to, before the second communication unit 51 transmits the synchronization instruction to the first edge application server and the second edge application server respectively, query the domain name resolution record based on the user identification information, and determine address information of the first edge application server and address information of the second edge application server.

In some optional embodiments of the present application, the second communication unit 51 is further configured to transmit a notification message to the SMF through a NEF or a PCF; where the notification message includes the user identification information and information of the second edge application server. The notification message is used to enable the SMF to configure a corresponding traffic offloading rule for a service corresponding to the user identification information.

In the embodiment of the present application, the second determination unit and the selection unit 52 in the apparatus may be implemented by CPU, DSP, MCU or FPGA in practical applications. The storage unit in the apparatus may be implemented through a memory in practical applications. The second communication unit 52 in the apparatus may be implemented, in practical applications, through a communication module (including: basic communication suite, operating system, communication modules, standardized interfaces and protocols, etc.) and transceiver antenna.

It is to be noted that when the handover processing apparatus provided in the above embodiments performs handover processing, it only uses division of the above program modules for illustration. In practical applications, the above processing may be assigned to different program modules for implementation, according to the needs, that is, an internal structure of the apparatus is divided into different program modules to complete all or part of the processing described above. In addition, the handover processing apparatus and the handover processing method embodiments provided in the above embodiments belong to the same concept, and the specific implementation process thereof is detailed in the method embodiments, which will not be repeated here.

Figure 9:
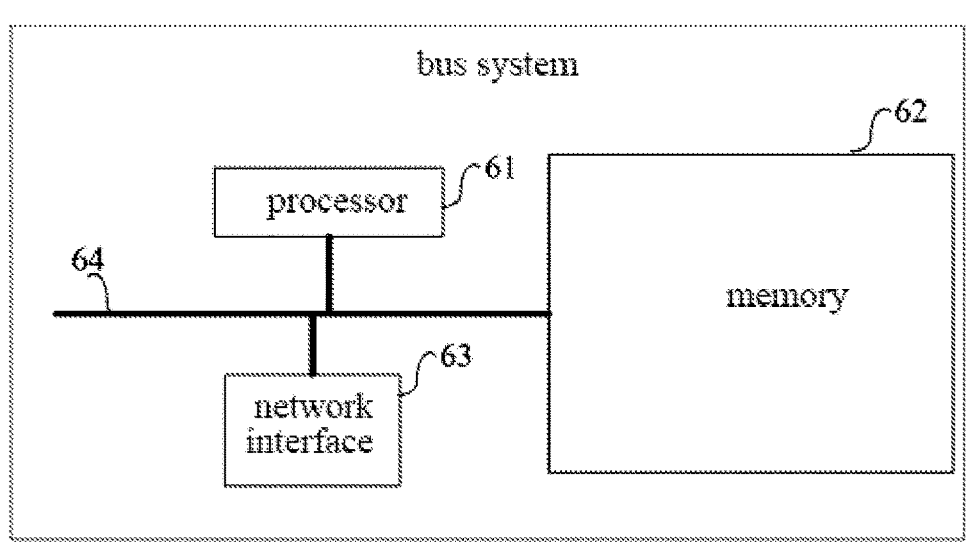
FIG. 9 is a schematic diagram showing hardware structures of a communication device according to an embodiment of the present application.

One embodiment of the present application further provides a communication device. The communication device may be an edge dispatch node or a user equipment (UE) provided with an application client. FIG. 9 is a schematic diagram showing hardware structures of a communication device according to an embodiment of the present application. As shown in FIG. 9, the communication device includes a memory 62, a processor 61, and a computer program stored in the memory 62 and executable on the processor 61. The processor 61 executes the program to perform steps of the above handover processing method applied to the application client or the edge dispatch node in the embodiment of the present application.

Optionally, the communication device further includes a network interface 63. Various components in the communication device are coupled together by a bus system 64. It is to be appreciated that the bus system 64 is used to implement connection communication between these components. In addition to data bus, the bus system 64 further includes a power bus, a control bus and a status signal bus. For the sake of clarity, the various buses are labeled as the bus system 64 in FIG. 9.

It is to be appreciated that the memory 62 may be either volatile memory or non-volatile memory, and may include both volatile and non-volatile memories. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a disc, or compact disc read-only memory (CD-ROM). The magnetic surface memory may be a magnetic disk memory or a magnetic tape memory. The volatile memory may be a random access memory (RAM), which is used as an external cache memory. By way of example and not limitation, many forms of RAM are available, such as static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced synchronous dynamic random access memory (ESDRAM), syncLink dynamic random access memory (SLDRAM), direct rambus random access memory (DRRAM). The memory 62 described in the embodiments of the present application is intended to include, but not be limited to, these and any other suitable types of memory.

The methods disclosed in the foregoing embodiments of the present application may be applied to the processor 61 or implemented by the processor 61. The processor 61 may be an integrated circuit chip with signal processing capabilities. During implementation, each step of the foregoing method may be completed by an integrated logic circuit of hardware in the processor 61 or instructions in the form of software. The foregoing processor 61 may be a general-purpose processor, DSP, or other programmable logic devices, discrete gate or transistor logic devices, discrete hardware components, and the like. The processor 61 can implement or perform various methods, steps and logic block diagrams disclosed in the embodiments of the present application. The general-purpose processor may be a microprocessor or any conventional processor or the like. The steps of the method disclosed in the embodiments of the present application may be directly implemented by a hardware decoding processor, or implemented by a combination of hardware and software modules in the decoding processor. The software modules may be in a storage medium, and the storage medium is in the memory 62. The processor 61 reads information in the memory 62 and completes the steps of the foregoing method in combination with its hardware.

In an exemplary embodiment, the communication device may be implemented by one or more application specific integrated circuit (ASIC), DSP, programmable logic device (PLD), complex programmable logic device (CPLD), FPGA, general-purpose processor, controller, MCU, microprocessor, or other electronic component, for performing the foregoing method.

In an exemplary embodiment, one embodiment of the present application further provides a computer-readable storage medium, such as a memory 62 including a computer program. The computer program can be executed by the processor 61 of the communication device to perform the steps of the foregoing method. The computer-readable storage medium may be a memory such as FRAM, ROM, PROM, EPROM, EEPROM, flash memory, magnetic surface memory, optical disk, or CD-ROM, and the computer-readable storage medium may also be various devices including one or any combination of the above memories.

The computer-readable storage medium provided in the embodiment of the present application stores a computer program thereon. The program is executed by a processor to perform the steps of the above handover processing method applied to the application client or the edge dispatch node in the embodiment of the present application.

The methods disclosed in the several method embodiments provided in the present application may be arbitrarily combined under condition of no conflict to obtain new method embodiments.

The features disclosed in the several product embodiments provided in the present application may be arbitrarily combined under condition of no conflict to obtain a new product embodiment.

The features disclosed in the several method or device embodiments provided in the present application may be combined arbitrarily under condition of no conflict to obtain a new method embodiment or a new device embodiment.

In the embodiments provided in the present application, it should be understood that the disclosed device and method may be realized by other modes. For example, the device embodiment described above is only illustrative, for example, the units are divided according to the logical function and can be divided in other modes in fact. For instance, multiple units or components can be combined with or can be integrated into another system, or some characteristics can be ignored, or are not executed. On the other hand, the coupling or direct coupling or communication connection shown or discussed among each other may be indirect coupling or communication connection through some interfaces, devices or units, which may be electrical, mechanical or in other forms.

The units described above as separation units may or may not be physically separated, and the components displayed as the units may or may not be the physical units. The units can be located in one place or distributed to multiple network units. Partial or all of these units may be selected according to actual requirements to realize the purpose of the solutions in embodiments of the present disclosure.

Further, each function unit in each embodiment of the present disclosure may be integrated into one processing unit, each unit may be set in a separate physical location, or two or more than two units may be integrated into one unit. The above integrated units may be implemented in the form of hardware, or in the form of hardware plus software functional units.

Those of ordinary skill in the art can understand that all or part of the steps for realizing the above method embodiments may be completed by instructing related hardware through a program. The foregoing program may be stored in a computer-readable storage medium. The program is executed to perform the steps of the above method embodiments. The foregoing storage medium includes various media that can store program codes, such as removable storage device, ROM, RAM, magnetic disks or optical disks.

Alternatively, when the above integrated units of the present application are implemented in the form of a software functional unit, and sold or used as an independent product, such software functional unit may be stored in a computer readable storage medium. On the basis of such understanding, essence of technical solution in the present disclosure, or a part thereof contributing to the existing technology may be embodied in the form of software products. A computer software product is stored in a storage medium, and includes several instructions to enable a computer device (which may be a personal computer, a server, or a network device, and so on) to execute all the blocks, or some blocks in a method of each embodiment in the present disclosure. The foregoing storage medium includes various media that can store program codes, such as removable storage device, ROM, RAM, magnetic disks or optical disks.

The above are optional embodiments of the present disclosure. It should be pointed out that, for persons having ordinary skill in the art, several improvements and changes may be made, without departing from the principle of the present disclosure. These improvements and changes should also be within the scope of the present disclosure.

The above are only specific embodiments of the present application, but the protection scope of the present application is not limited to this. For persons having ordinary skill in the art, several improvements and changes may be made, without departing from the principle of the present disclosure. These improvements and changes should also be within the scope of the present disclosure. Therefore, the protection scope of the present application shall be subject to the protection scope of the claims.

What is claimed is:

1. A handover processing method, comprising:

receiving, by a user equipment (UE), user plane function (UPF) handover information transmitted by a first edge application server before updating;

determining, by the UE, whether a pre-defined condition is met, wherein the pre-defined condition comprises that the UE has been switched from a UPF to another UPF;

transmitting, by the UE, a domain name system (DNS) resolution request carrying first information, to an edge dispatch node, in response to determining by the UE that the pre-defined condition is met, wherein the first information includes user identification information, application identification information and service continuity needs; and receiving a DNS resolution response from the edge dispatch node, wherein the DNS resolution response includes address information of an updated second edge application server, which is updated in accordance with user identification information, application identification information and service continuity needs included in the first information, wherein the UPF handover information is transmitted after the first edge application server receives a notification message from a session management function (SMF), which indicates that accessing UPF of the UE changes.

2. The method according to claim 1, wherein the method further includes:

obtaining, by the UE, a connection status parameter between the UE and a first edge application server;

when the connection status parameter reaches a preset threshold, determining that the pre-defined condition is met.

3. The method according to claim 1, wherein an extension field in the DNS resolution request carries the user identification information.

4. A non-transitory computer-readable storage medium, comprising a computer program stored thereon; wherein the program is executed by a processor to perform the steps of the method according to claim 1.

5. A handover processing method, comprising:

receiving, by an edge dispatch node, a domain name system (DNS) resolution request from a user equipment (UE); wherein the DNS resolution request carries first information, and the first information includes user identification information, application identification information and service continuity needs;

reselecting a second edge application server (EAS), which is updated in accordance with user identification information, application identification information and service continuity needs included in the first information, for the UE based on the service continuity needs and the user identification information, and transmitting a DNS resolution response to the UE, wherein the DNS resolution response carries address information of the second edge application server, wherein the method further includes:

storing, by the edge dispatch node, a domain name resolution record; wherein the domain name resolution record includes at least mapping relationship between multiple sets of user identification information and address information of a first EAS and the second EAS.

6. The method according to claim 5, wherein before transmitting, by the edge dispatch node, the synchronization instruction to the first edge application server and the second edge application server, respectively, the method further includes:

querying, by the edge dispatch node, the domain name resolution record, based on the user identification information, and determining address information of the first edge application server and the address information of the second edge application server.

7. A communication device, comprising: a memory, a processor and a computer program stored in the memory and executable on the processor; wherein the processor executes the program to perform the steps of the method according to claim 5.

8. The communication device according to claim 7, wherein before transmitting the synchronization instruction to the first edge application server and the second edge application server, respectively, the processor executes the program to perform:

querying the domain name resolution record, based on the user identification information, and determining address information of the first edge application server and the address information of the second edge application server.

9. A non-transitory computer-readable storage medium, comprising a computer program stored thereon; wherein the program is executed by a processor to perform the steps of the method according to claim 5.

10. The method according to claim 5, wherein the method further includes:

transmitting, by the edge dispatch node, a synchronization instruction to a first edge application server and the second edge application server, respectively; wherein the first edge application server is an edge application server before updating, and the synchronization instruction includes: user identification information, application identification information and service continuity needs; which instructs the first edge application server (EAS) to synchronize service data corresponding to the user identification information to the second EAS.

11. The method according to claim 5, wherein the method further includes:

transmitting, by the edge dispatch node, a notification message to a session management function (SMF) through a network exposure function (NEF) or a policy control function (PCF); wherein the notification message includes the user identification information and information of the second edge application server, the notification message is used to enable the SMF to configure a corresponding traffic offloading rule for a service corresponding to the user identification information.

12. A communication device, comprising: a memory, a processor and a computer program stored in the memory and executable on the processor; wherein the processor executes the program to perform:

receiving user plane function (UPF) handover information transmitted by a first edge application server before updating;

determining whether a pre-defined condition is met, wherein the pre-defined condition comprises that a user equipment (UE) has been switched from a UPF to another UPF;

transmitting a domain name system (DNS) resolution request carrying first information, to an edge dispatch node, in response to determining by the UE that the pre-defined condition is met, wherein the first information includes user identification information, application identification information and service continuity needs; and receiving a DNS resolution response from the edge dispatch node, wherein the DNS resolution response includes address information of an updated second edge application server, which is updated in accordance with user identification information, application identification information and service continuity needs included in the first information, wherein the UPF handover information is transmitted after the first edge application server receives a notification message from a session management function (SMF), which indicates that accessing UPF of the UE changes.

13. The communication device according to claim 12, wherein the processor executes the program to perform:

obtaining a connection status parameter with a first edge application server;

when the connection status parameter reaches a preset threshold, determining that the pre-defined condition is met.

14. The communication device according to claim 12, wherein an extension field in the DNS resolution request carries the user identification information.

* * * * *